United States Patent
Hama et al.

(10) Patent No.: US 11,386,695 B2
(45) Date of Patent: Jul. 12, 2022

(54) AUTHENTICATION DEVICE AND AUTHENTICATION METHOD

(71) Applicant: FUJITSU LIMITED, Kawasaki (JP)

(72) Inventors: Soichi Hama, Atsugi (JP); Satoshi Maeda, Atsugi (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 16/433,139

(22) Filed: Jun. 6, 2019

(65) Prior Publication Data

US 2019/0392191 A1 Dec. 26, 2019

(30) Foreign Application Priority Data

Jun. 22, 2018 (JP) .............................. JP2018-118473

(51) Int. Cl.
*G06V 40/40* (2022.01)
*G06V 40/12* (2022.01)
*G06V 10/141* (2022.01)
*G06V 40/13* (2022.01)
*G06V 40/14* (2022.01)

(52) U.S. Cl.
CPC ........ *G06V 40/1365* (2022.01); *G06V 10/141* (2022.01); *G06V 40/13* (2022.01); *G06V 40/45* (2022.01); *G06V 40/14* (2022.01)

(58) Field of Classification Search
CPC ........... G06K 9/00087; G06K 9/00906; G06K 9/2027; G06K 9/00013; G06K 2009/00932
See application file for complete search history.

(56) References Cited

U.S. PATENT DOCUMENTS

| 6,404,904 | B1 | 6/2002 | Einighammer et al. |
| 7,379,114 | B2 * | 5/2008 | Adachi .................. G06V 40/40 348/222.1 |
| 8,385,611 | B2 * | 2/2013 | Shinzaki ............ G06V 40/1335 283/68 |
| 8,570,148 | B2 * | 10/2013 | Amano ................ A61B 5/0059 340/5.82 |

(Continued)

FOREIGN PATENT DOCUMENTS

| JP | 11-339048 A | 12/1999 |
| JP | 2003-030659 | 1/2003 |

(Continued)

OTHER PUBLICATIONS

EESR—The Extended European Search Report of European Patent Application No. 19177258.1 dated Oct. 17, 2019.

(Continued)

*Primary Examiner* — Shaghayegh Azima
(74) *Attorney, Agent, or Firm* — Fujitsu Patent Center

(57) ABSTRACT

An authentication device includes an illumination device, a camera, and a processor configured to obtain, by capturing by the camera, an image including a subject illuminated with light of the illumination device, extract a target region from the obtained image, and perform determination that processing related to authentication is not allowed when the target region includes a first part of a first luminance value having a difference not less than a threshold value from a second luminance value of a second part of the target region.

17 Claims, 9 Drawing Sheets

(56) References Cited

U.S. PATENT DOCUMENTS

| | | | |
|---|---|---|---|
| 8,977,009 B2* | 3/2015 | Jo | G06V 40/13 |
| | | | 382/283 |
| 9,298,965 B2* | 3/2016 | Aoki | G06V 10/141 |
| 2003/0012413 A1 | 1/2003 | Kusakari et al. | |
| 2006/0250218 A1* | 11/2006 | Kondo | G06V 40/18 |
| | | | 340/5.82 |
| 2013/0011015 A1* | 1/2013 | Jo | G06V 40/13 |
| | | | 382/103 |
| 2013/0259321 A1* | 10/2013 | Aoki | G06V 10/141 |
| | | | 382/115 |
| 2014/0037196 A1* | 2/2014 | Blair | G07D 7/206 |
| | | | 382/159 |
| 2016/0088203 A1* | 3/2016 | Maeda | G06V 40/70 |
| | | | 362/230 |
| 2017/0091568 A1 | 3/2017 | Hama et al. | |
| 2017/0098116 A1* | 4/2017 | Brownlee | G06V 40/1324 |
| 2017/0115230 A1* | 4/2017 | Kurihara | G01N 21/8851 |
| 2017/0300738 A1* | 10/2017 | Li | G06V 40/1365 |
| 2017/0364728 A1* | 12/2017 | Bachurinskii | G06V 40/1382 |
| 2018/0165512 A1* | 6/2018 | Fan | G06V 10/145 |
| 2018/0173979 A1* | 6/2018 | Fan | G06V 40/45 |
| 2018/0349721 A1* | 12/2018 | Agrawal | G06V 40/45 |
| 2019/0170506 A1* | 6/2019 | Matsumoto | G06T 7/521 |
| 2021/0082005 A1* | 3/2021 | David | G06Q 30/0279 |
| 2021/0173206 A1* | 6/2021 | Das | G06F 21/32 |
| 2022/0027598 A1* | 1/2022 | Lee | G06V 40/1365 |

FOREIGN PATENT DOCUMENTS

| | | |
|---|---|---|
| JP | 2004-215807 | 8/2004 |
| JP | 2008-099783 | 5/2008 |
| JP | 2017-068597 | 4/2017 |
| JP | 2017-167667 | 9/2017 |

OTHER PUBLICATIONS

C. Stein et al., "Video-based Fingerphoto Recognition with Anti-spoofing Techniques with Smartphone Cameras", 2013 International Conference of the BIOSIG Special Interest Group (BIOSIG), Gesellschaft Fur Informatik E. V. (GI), XP032495100, [retrieved on Oct. 1, 2013], pp. 1-12, Sep. 5, 2013.

EPOA—Communication pursuant to Article 94(3) EPC of European Patent Application No. 19177258.1 dated Jun. 15, 2021 (7 pages). ** Reference cited in the EPOA was previously submitted in the IDS filed on Dec. 10, 2019.

Japanese Office Action dated May 24, 2022 for corresponding Japanese Patent Application No. 2018-118473, with English Translation, 16 pages.

* cited by examiner

AUTHENTICATION DEVICE AND AUTHENTICATION METHOD

CROSS-REFERENCE TO RELATED APPLICATION

This application is based upon and claims the benefit of priority of the prior Japanese Patent Application No. 2018-118473, filed on Jun. 22, 2018, the entire contents of which are incorporated herein by reference.

FIELD

The embodiment discussed herein is related to a biometric authentication technology.

BACKGROUND

There is, for example, a biometric authentication technology that performs personal identification using biometric features such as fingerprints, faces, or veins. In biometric authentication, for example, a biometric feature (template) of a user, the biometric feature (template) being registered in advance, is compared with a biometric feature of the user, the biometric feature being obtained at a time of the authentication, and personal identification (verification processing) is performed.

Biometric authentication uses a biometric feature of a user. Thus, there is a low risk of loss or theft as compared with means for authentication such as a card carried by the user. However, there is a risk of spoofing by a forged object.

There is, for example, a technology of imaging a parallel polarized light image and an orthogonal polarized light image by using a polarizing filter, and determining whether or not a subject is a living body based on these images in different polarization states. There is another technology that determines whether or not a subject is a biological tissue based on correlation between an irradiation image obtained by imaging a subject irradiated with light and a non-irradiation image obtained by imaging a subject not irradiated with light.

Related technologies are disclosed in Japanese Laid-open Patent Publication No. 2017-68597 and Japanese Laid-open Patent Publication No. 2017-167667, for example.

SUMMARY

According to an aspect of the embodiment, an authentication device includes an illumination device, a camera, and a processor configured to obtain, by capturing by the camera, an image including a subject illuminated with light of the illumination device, extract a target region from the obtained image, and perform determination that processing related to authentication is not allowed when the target region includes a first part of a first luminance value having a difference not less than a threshold value from a second luminance value of a second part of the target region.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Figure 1:
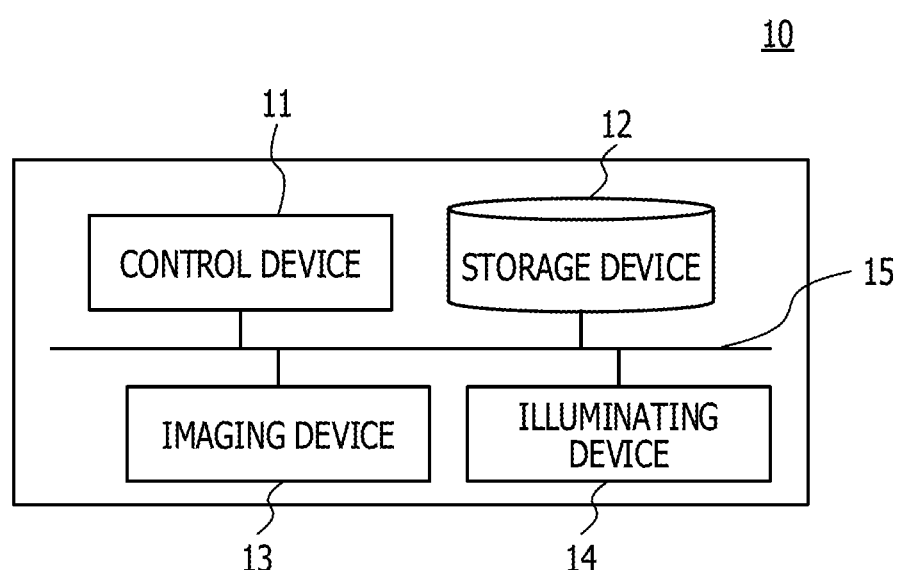
FIG. 1 is a diagram illustrating an example of a hardware configuration of an authentication device.

In conventional technology, it may be necessary to compare a plurality of captured images so as to determine whether or not a subject is a living body, and the processing is complicated.

An embodiment will hereinafter be described in detail with reference to the drawings. Each piece of processing in the embodiment may be changed as appropriate. Incidentally, in all of diagrams of assistance in explaining the embodiment, the same parts are identified by the same reference numerals in principle, and repeated description thereof will be omitted. Incidentally, in the embodiment, description will be made by taking vein authentication as an example. However, an authentication method is applicable also to other biometric authentications that are performed based on a captured image obtained by imaging a subject irradiated with light. For example, the authentication method may be a fingerprint authentication or a face authentication.

FIG. 1 is a diagram illustrating an example of a hardware configuration of an authentication device 10 according to the embodiment. The authentication device 10 includes a control device 11, a storage device 12, an imaging device 13, and an illuminating device 14, which are coupled to each other via a system bus 15 so as to be capable of mutual input and output of signals. Incidentally, the imaging device 13 and the illuminating device 14 will be collectively referred to as a biosensor.

The control device 11 is a device that controls the authentication device 10. The control device 11 may be an electronic circuit such as one or plurality of central processing units (CPUs) or micro processing units (MPUs). The control device 11 performs various kinds of processing by controlling operation of the authentication device 10, the various kinds of processing being various kinds of operations, data input and output from and to each hardware constituent unit, and the like, based on an operating system (OS) and various kinds of programs stored in the storage device 12. Various kinds of information needed during the execution of the programs and the like may be obtained from the storage device 12, for example. Incidentally, a part of the processing performed by the control device 11 may be implemented by using dedicated hardware.

The control device 11 performs authentication processing according to the embodiment based on an authentication program according to the embodiment. The number of control devices 11 may be one, or the authentication device 10 may include a plurality of control devices 11. In that case, the plurality of control devices 11 may share in performing the authentication processing according to the embodiment. In addition, the authentication processing is applicable to either of one-to-one authentication and one-to-N authentication.

The storage device 12, for example, stores the authentication program according to the embodiment. The storage device 12 may include a main storage device and an auxiliary storage device. The main storage device, for example, temporarily stores at least a part of the OS and an application program executed by the control device 11. In addition, the main storage device stores various kinds of data needed for the processing of the control device 11. Incidentally, a random access memory (RAM), a flash memory, or the like may be used as the main storage device.

The auxiliary storage device may read various kinds of information stored therein or write information therein based on an instruction from the control device 11. A storage or the like such as a hard disk drive (HDD) or a solid state drive (SSD) may be used as the auxiliary storage device. The auxiliary storage device may store information used in the authentication processing according to the embodiment and a result of the processing. In addition, the main storage device and the auxiliary storage device may each assume the functions of the other.

The imaging device 13 is an imaging device that images a subject based on an instruction from the control device 11. For example, in a state in which a user is holding the palm of a hand over the biosensor with the palm at a distance of 4 to 5 cm from the biosensor, the imaging device 13 images an image including the palm of the hand of the user in a noncontact manner. A complementary metal oxide semiconductor (CMOS) camera or a charge coupled device (CCD) camera, for example, may be used as the imaging device 13. In addition, the imaging device 13 does not have to incorporate an infrared cut filter employed in an ordinary camera.

The illuminating device 14 is, for example, a device that irradiates the subject with light when the imaging device 13 performs imaging. The illuminating device 14 may use a light emitting diode (LED) light source, or may be an infrared LED. The illuminating device 14 may apply near-infrared light including visible light. Hence, the biosensor may employ an identical configuration to that of an existing vein authentication device.

Figure 2:
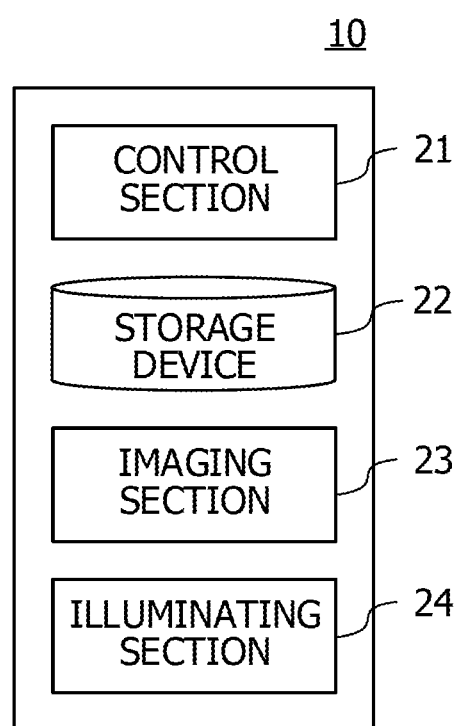
FIG. 2 is a diagram illustrating an example of a functional configuration of an authentication device.

FIG. 2 is a diagram illustrating an example of a functional configuration of the authentication device 10 according to the embodiment. The authentication device 10 includes, as functions, a control section 21, a storage section 22, an imaging section 23, and an illuminating section 24. The control device 11 reads a program stored in the storage device 12, and performs various kinds of processing by using hardware included in the authentication device 10. Functions of the control section 21, the storage section 22, the imaging section 23, and the illuminating section 24 are thereby implemented.

The present embodiment utilizes the following phenomenon. When the palm of a hand (living body) is captured while irradiated with light by an illuminating device designed to illuminate the subject within an imaging range with substantially uniform brightness, for example, a captured image is obtained in which a region of the palm of the hand (target region) has a substantially uniform brightness. On the other hand, a specular reflection is observed when a non-living body such as printed matter on which the palm of a hand is printed or a liquid crystal display displaying a living body is captured while irradiated with light. For example, the non-living subject produces regular reflection of the applied light. Consequently, a high-luminance section (regular reflection image) relatively brighter than other parts in the region of the palm of the hand is detected with a certain size from the captured image. Incidentally, the certain size is a size corresponding to the size of a light source and a distance between the subject and the biosensor.

Figure 3:
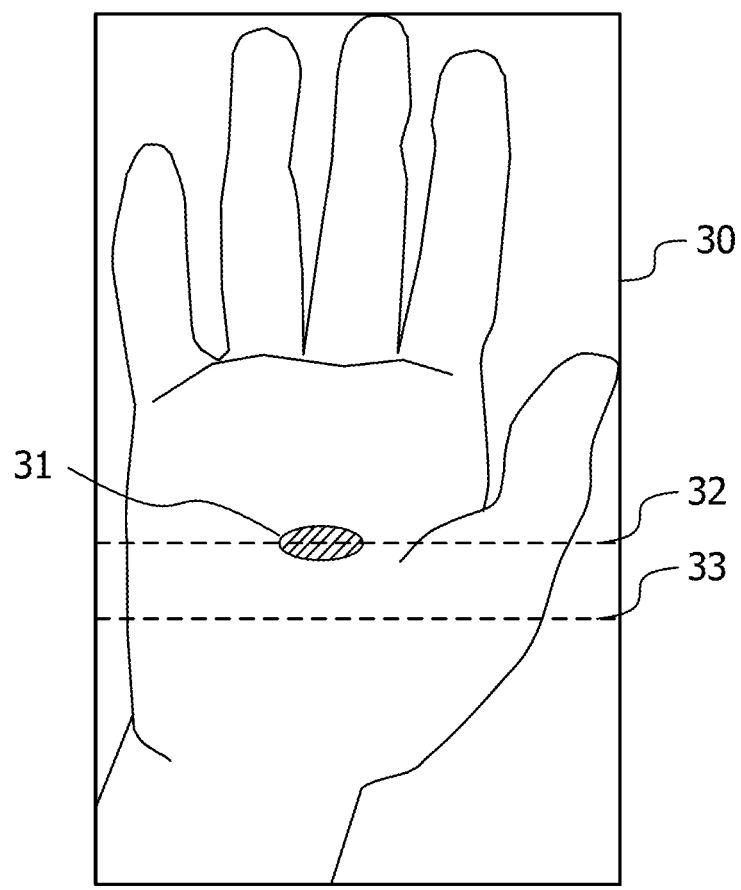
FIG. 3 is a diagram illustrating an example of a captured image.

FIG. 3 is a diagram illustrating an example of a captured image. The captured image 30 represents an example of a captured image obtained by imaging printed matter (non-living body) on which the palm of a hand is printed, for example. The captured image 30 may include a vein pattern not illustrated. As illustrated in FIG. 3, an illumination reflection region (regular reflection image) 31 is observed in the image obtained by imaging the non-living body while irradiating the non-living body with light. Incidentally, a dotted line 32, for example, represents a straight line that passes through the reflection region 31 and is parallel with an axis of abscissas of the image. A dotted line 33, for example, represents a straight line that does not pass through the reflection region 31 and is parallel with the axis of abscissas of the image. Incidentally, the dotted line 32 and the dotted line 33 are drawn on the captured image 30 for description, and are not straight lines displayed on the real captured image 30.

Figure 4:
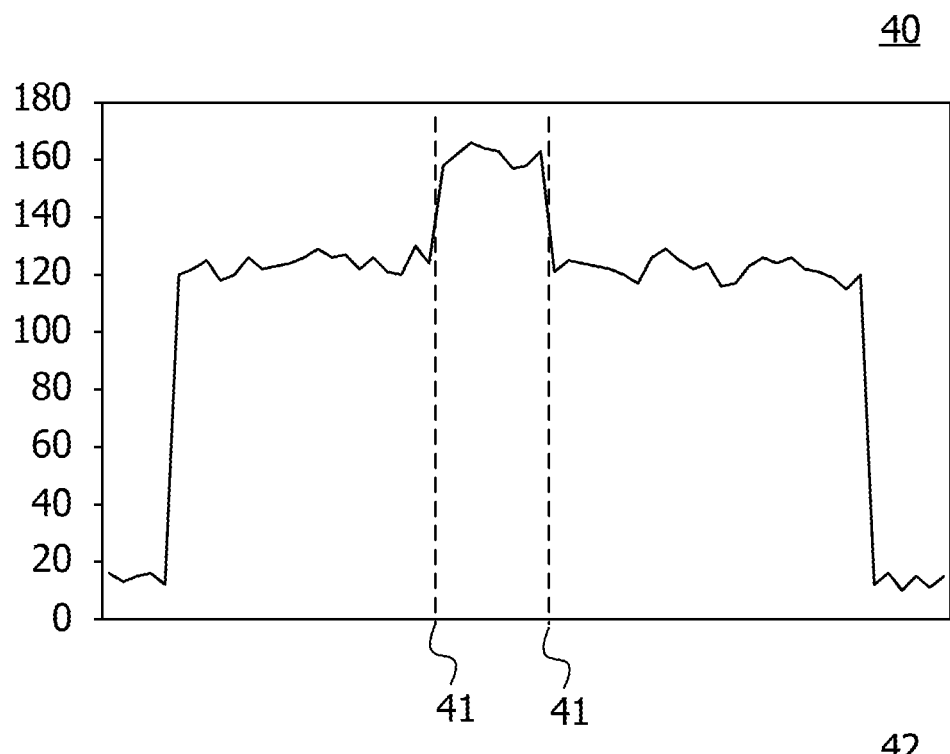
FIG. 4 is a diagram illustrating an example of graphs of luminance values.
Figure 4:
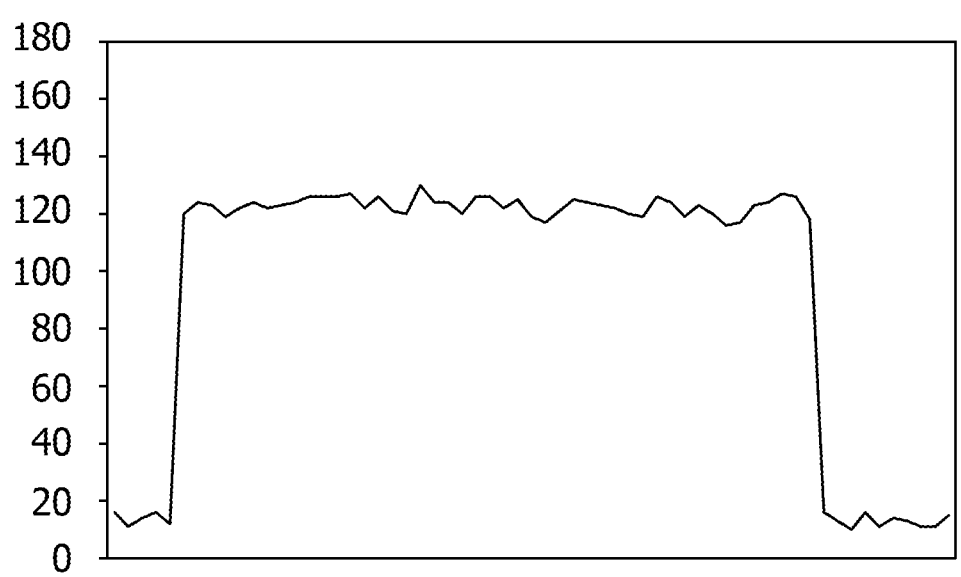

FIG. 4 is a diagram illustrating an example of graphs of luminance values. A graph 40 is a graph of luminance values of pixels on the dotted line 32, and corresponds to a plot of the luminance values of the respective pixels on the dotted line 32 with an axis of abscissas indicating each pixel that the dotted line 32 passes through and with an axis of ordinates indicating luminance values. Incidentally, dotted lines 41 are auxiliary lines drawn on the graph 40 for description, and are different from the plot of the luminance values. As illustrated in the graph 40, an average of luminance values in a section (reflection region) interposed between the dotted lines 41 is approximately 160, and an average of luminance values of other parts in the region of the palm of the hand is approximately 120.

In addition, a graph 42 is a graph of luminance values of pixels on the dotted line 33, and corresponds to a plot of the luminance values of the respective pixels on the dotted line 33 with an axis of abscissas indicating each pixel that the dotted line 33 passes through and with an axis of ordinates indicating luminance values. As illustrated in the graph 42, there is no section (reflection region) of high luminance values, and an average of luminance values of the region of the palm of the hand is approximately 120. Thus, in the region in which a specular reflection is observed, differences from the luminance values of the neighboring regions are equal to or more than a threshold value (5, for example).

In the case where the subject is a living body, on the other hand, there is substantially uniform luminance within the region of the palm of the hand, and a relatively high luminance part of luminance values whose differences are equal to or more than the threshold value is not detected within the region of the palm of the hand. Hence, based on luminance within the region of the palm of the hand in the captured image, it is possible to determine that the subject is a non-living body when a luminance difference equal to or more than the threshold value is detected within the region of the palm of the hand. The threshold value may be set as appropriate according to the illumination intensity and imaging sensitivity of the biosensor, for example.

A concrete operation of the authentication device 10 will next be illustrated. The illuminating section 24, for example, irradiates the subject with light based on an instruction of the control section 21. The imaging section 23, for example, images the subject irradiated with light based on an instruction of the control section 21. The storage section 22 stores the captured image based on an instruction of the control section 21. In vein authentication, for example, the illuminating section 24 may irradiate the subject with near-infrared light, and the imaging section 23 may image a near-infrared image (gray scale image).

The control section 21, for example, extracts a target region (a region of the palm of a hand, for example) from the captured image. The processing of extracting the target region may, for example, identify a contour line from edge detection of the captured image, and extract the target region by pattern matching. The processing of extracting the target region may be implemented by an existing technology. The control section 21 determines whether or not there is a luminance value difference equal to or more than the threshold value within the extracted target region. When the control section 21 detects a luminance value difference (change) equal to or more than the threshold value, the control section 21 determines that the captured image (the target region) includes a non-living body image. When the control section 21 does not detect any luminance value difference equal to or more than the threshold value, on the other hand, the control section 21 determines that the captured image does not include a non-living body image.

The control section 21 determines a luminance value difference based on the luminance value of each pixel included in the target region. The control section 21, for example, calculates luminance value differences by comparing the luminance values of respective pixels on a straight line parallel with the axis of abscissas or the axis of ordinates of the captured image within the target region with each other. The control section 21 may calculate luminance value differences a plurality of times by shifting the straight line at given intervals in order. The control section 21 determines whether one or a plurality of calculated luminance value differences are equal to or more than the threshold value.

As another method, the control section 21 may, for example, generate a histogram of the luminance values of the respective pixels included in the target region, classify each pixel into groups whose number corresponds to the number of peaks of the histogram according to the luminance value of each pixel, calculate an average value of luminance values in each of regions including the pixels classified as different groups, and determine a luminance value difference based on a difference between the average values of luminance values of the groups.

Figure 5:
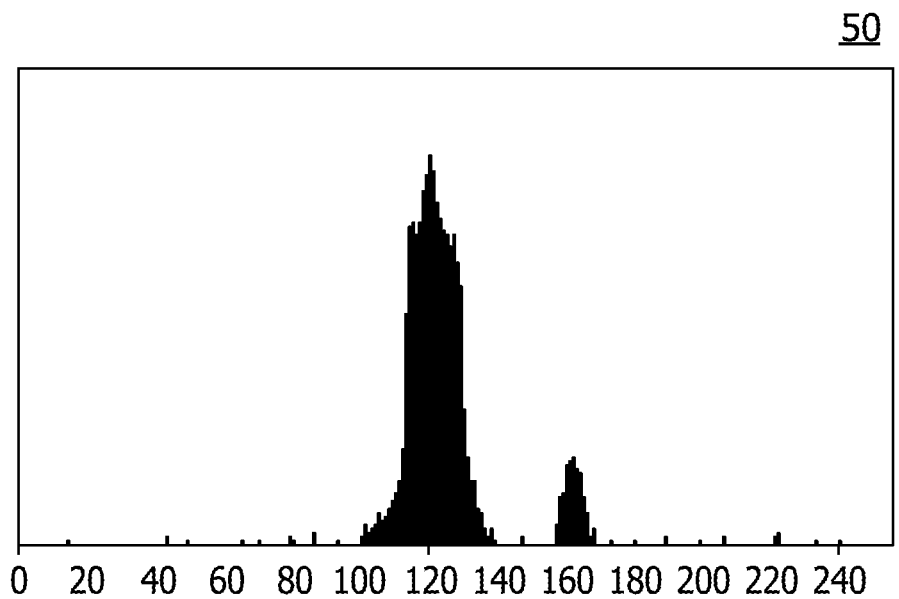
FIG. 5 is a diagram illustrating an example of a histogram of luminance values.

FIG. 5 is a diagram illustrating an example of a histogram of luminance values. The histogram 50, for example, indicates a distribution of luminance values of the target region of the captured image 30 with an axis of abscissas indicating luminance values and with an axis of ordinates indicating the number of pixels. In the histogram 50, two distribution peaks at luminance values of approximately 120 and approximately 160 are observed. The control section 21, for example, classifies each pixel within the target region into two groups according to the two distribution peaks. The control section 21 may, for example, set pixels having luminance values higher than 100 and equal to or lower than 150 as a group 1, and set pixels having luminance values higher than 150 and equal to or lower than 170 as a group 2. In this case, the control section 21 may determine whether a difference between an average value of the luminance values of the pixels classified into the group 1 and an average value of the luminance values of the pixels classified into the group 2 is equal to or more than a threshold value. In this case, there is a luminance value difference of approximately 40 between the groups, and therefore a high-luminance part is detected sufficiently when the threshold value is set at 5, for example.

However, a part of locally high luminance may be observed due to a wrinkle of the hand or the like within the target region. A wrinkle of a hand is very fine as compared with the illuminating device 14, and the part of locally high luminance represents a luminance change in a very narrow area as compared with a specular reflection of illumination. Hence, the control section 21, for example, may not use a high-luminance part less than a given area for the determination of a luminance value difference. It is thereby possible to reduce erroneous determination due to a wrinkle of a hand or the like. The control section 21 may, for example, identify the area of the high-luminance part based on the number of pixels that are classified as a high-luminance group and are continuous with each other (adjacent to each other). Incidentally, the given area may be set in advance.

In addition, the control section 21 may remove the local high-luminance part in advance by subjecting the obtained captured image to smoothing processing. Cited as the smoothing processing is, for example, a method that, for the luminance value of each pixel within the target region of the captured image, corrects the luminance value of the pixel to be corrected to an average value of the luminance value of the pixel to be corrected and the luminance values of pixels neighboring the pixel to be corrected. Incidentally, in the present embodiment, the high-luminance part represents a part of relatively high luminance as compared with other parts in the target region.

The control section 21 determines that authentication is not possible when determining that the captured image (the target region) includes a non-living body image. When the control section 21 determines that authentication is not possible, the control section 21 may, for example, end the authentication processing, and output warning information. In a case where the authentication device 10 is provided with a display device such as a liquid crystal display, for example, the authentication device 10 may display information indicating that the authentication processing is discontinued on the display device.

When the control section 21 determines that the captured image (the target region) does not include a non-living body image, for example, the control section 21 performs personal identification as to whether the subject is a user registered in advance by comparing a feature quantity of the target region with a template stored in the storage section 22 (verification processing). Incidentally, an ordinary existing technology may be applied to the verification processing.

Figure 6:
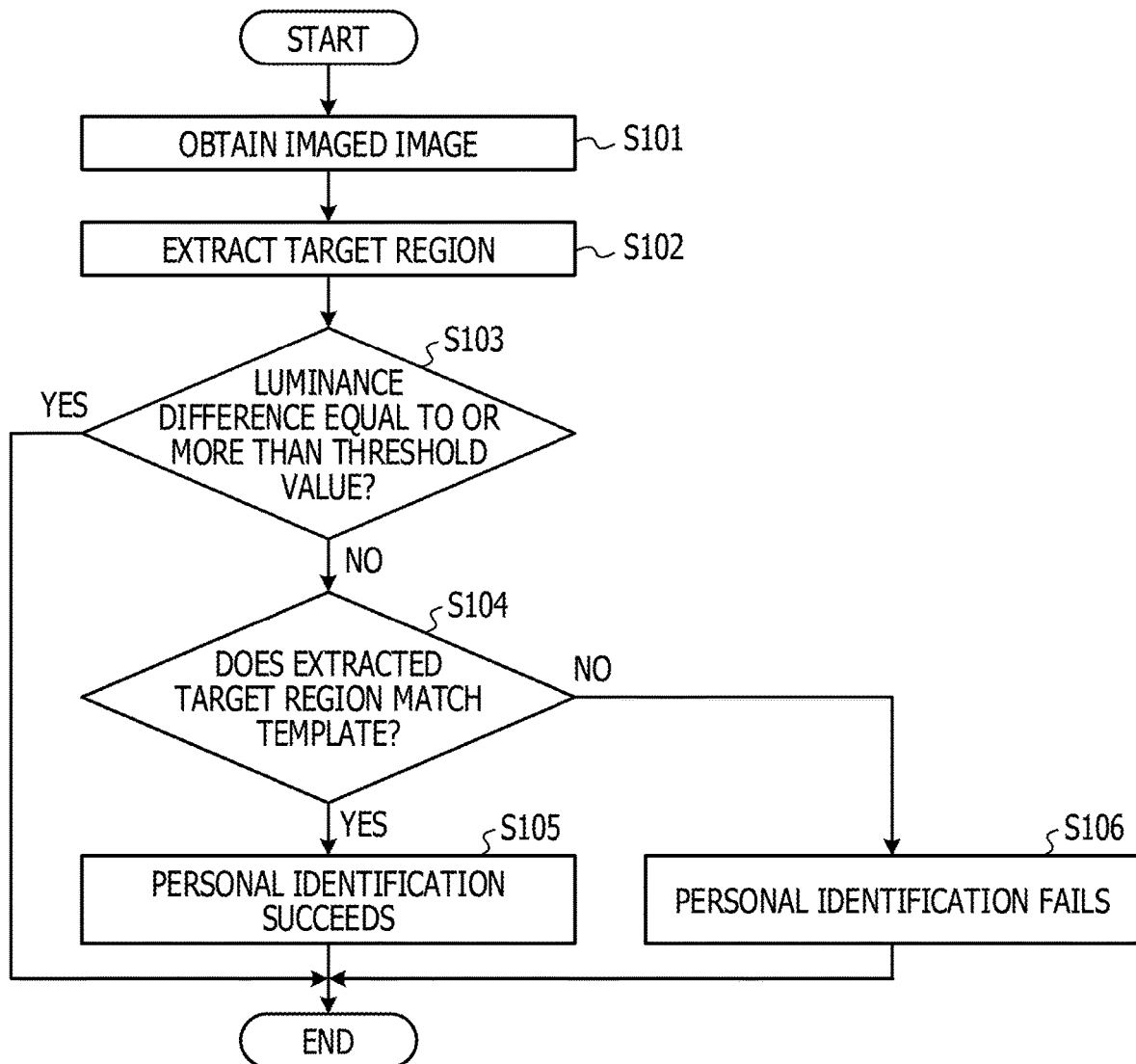
FIG. 6 is a flowchart illustrating an example of an authentication processing procedure of an authentication device.

Description will next be made of an example of an authentication processing procedure of the authentication device 10 according to the embodiment. FIG. 6 is a flowchart illustrating an example of the authentication processing procedure of the authentication device 10.

The control section 21 of the authentication device 10, for example, obtains a captured image by making the imaging section 23 image a subject in a state in which the illuminating section 24 is made to apply light (S101). The control section 21 extracts a target region from the obtained captured image (S102). The control section 21 determines whether or not there is a luminance difference equal to or more than the threshold value in the extracted target region (S103).

When there is a luminance difference equal to or more than the threshold value (Yes in S103), the control section 21 determines that the target region is a non-living body image, and ends the authentication processing. In this case, the control section 21 may, for example, output information indicating that the authentication processing is discontinued.

When there is no luminance difference equal to or more than the threshold value (No in S103), the control section 21 performs the verification processing of the extracted target region and a template registered in advance, and determines whether the extracted target region matches the template (S104).

When the extracted target region matches the template (Yes in S104), the control section 21 determines that personal identification (the verification processing) has succeeded (S105), and ends the authentication processing. In this case, the control section 21 may, for example, output information indicating that the authentication processing has succeeded.

When the extracted target region does not match the template (No in S104), the control section 21 determines that personal identification (the verification processing) has failed (S106), and ends the authentication processing. In this case, the control section 21 may, for example, output information indicating that the authentication processing has failed.

As described above, according to the present embodiment, the authentication device 10 discontinues the authentication processing when determining that the subject of the captured image is a non-living body. It is therefore possible to suppress a success of authentication by spoofing.

In addition, according to the present embodiment, when the authentication device 10 determines that the subject of the captured image is a living body, the authentication device 10 may also perform the verification processing directly based on the captured image. Hence, spoofing determination does not need imaging processing for a captured image not related to the verification processing. It is thus also possible to suppress a delay in the processing time of the whole of the authentication processing as compared with a case where a separate comparison image is captured for spoofing determination.

Incidentally, in the present embodiment, an example is cited in which the verification processing is performed after it is determined that the target region is a living body image. However, the processing method is not limited to this. The processing of determining whether the subject is a living body or a non-living body and the verification processing for personal identification of the subject may be performed in parallel with each other. In this case, in a case where the authentication device 10 determines that the subject is a non-living body, the authentication device 10 determines that authentication is not possible (failure) even when the personal identification has succeeded in the verification processing. The authentication device 10 may further shorten the processing time of the whole of the authentication processing in the case where the authentication device 10 performs the processing of determining whether the subject is a living body or a non-living body and the verification processing for personal identification in parallel with each other.

Further, in the present embodiment, an example is cited in which the processing of determining whether the subject is a living body or a non-living body is performed in the authentication processing. However, the processing of determining whether the subject is a living body or a non-living body may be performed in processing of user registration. For example, the authentication device 10 may perform the processing of determining whether the subject is a living body or a non-living body for the captured image captured when user registration is to be performed, and determine whether or not the captured image can be registered as a template. For example, when the authentication device 10 determines that the subject is a non-living body, the authentication device 10 may not register the captured image as a template of the verification processing for personal identification.

In addition, according to the present embodiment, an existing biosensor may be applied, and determination as to whether or not the subject is a living body (spoofing determination) may be made without the addition of a special device and without a need to change the hardware configuration of an existing authentication device.

Description will next be made of a modification of the embodiment. In the description of the modification, the same parts as in the embodiment are identified by the same reference numerals, and description thereof will be omitted. In the modification, when a high-luminance part is detected from within the target region of a captured image, the authentication device 10 determines whether the detected high-luminance part corresponds to the configuration of the biosensor of the authentication device 10.

A concrete operation of the authentication device 10 will be illustrated in the following. When a part of high luminance is detected, the high luminance being equal to or more than a threshold value as compared with other parts of the target region of the captured image, the authentication device 10 determines whether the shape of the detected part and the shape of the biosensor match each other by pattern matching. Incidentally, in addition to the shape of the biosensor, the pattern matching may also be applicable to, for example, the number and arrangement relation of illuminating devices 14 included in the biosensor. Incidentally, an allowable range of errors may be set for the pattern matching as in ordinary pattern matching, and the pattern matching is not limited to an exact match.

When the detected part matches according to the pattern matching, the authentication device 10 determines that the subject is not a living body, and discontinues the authentication processing. When the detected part does not match according to the pattern matching, on the other hand, the authentication device 10 determines that the subject is a living body, and performs the verification processing.

Figure 7:
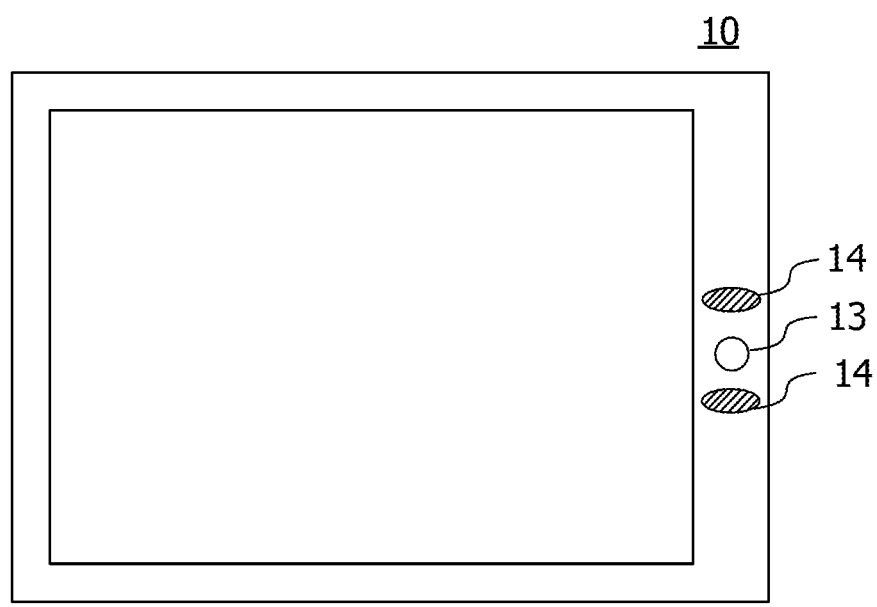
FIG. 7 is a diagram illustrating an example of an authentication device.

FIG. 7 is a diagram illustrating an example of an authentication device. In the modification, the authentication device 10 is, for example, a tablet terminal. In the modification, the authentication device 10 includes a biosensor in a frame portion. The biosensor, for example, includes an imaging device 13 and two illuminating devices 14 in such an arrangement relation as to sandwich the imaging device 13. Incidentally, the number of illuminating devices 14 and the arrangement relation between the imaging device 13 and the illuminating devices 14 may be those illustrated in FIG. 7 or may be changed as appropriate.

Figure 8:
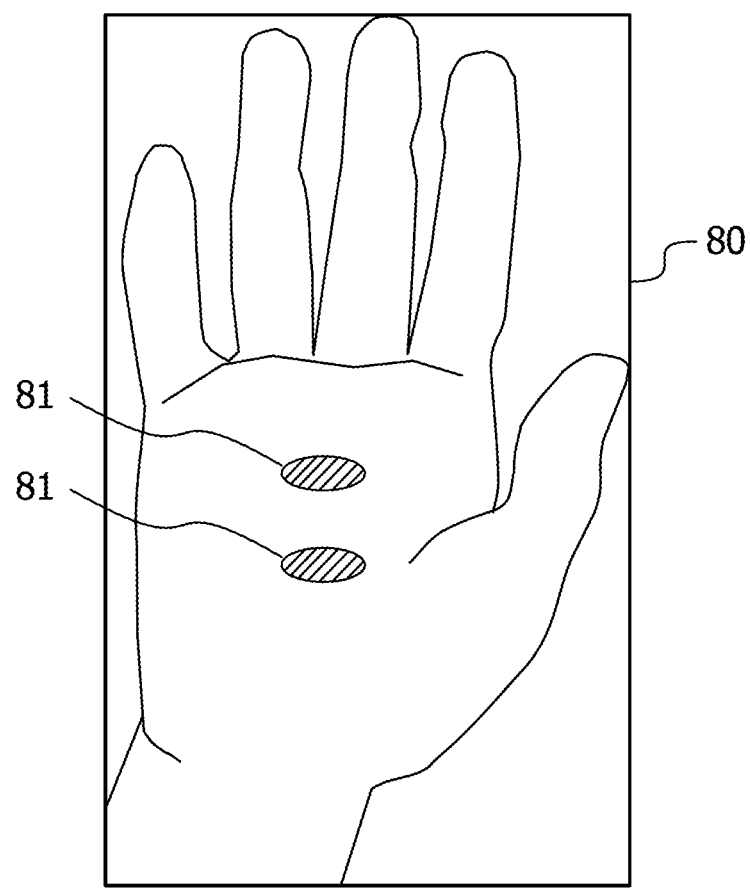
FIG. 8 is a diagram illustrating an example of a captured image.

FIG. 8 is a diagram illustrating an example of a captured image. The captured image 80 represents an example of a captured image obtained by imaging printed matter on which a living body is printed, for example. The captured image 80 may include a vein pattern not illustrated. As illustrated in FIG. 8, in a case where the subject is a non-living body, the captured image 80 includes reflection regions 81 corresponding to the shape, number, and arrangement of the illuminating devices 14 included in the biosensor. For example, the shape of the reflection regions 81 and the shape of the illuminating devices 14 are similar shapes. In addition, for example, the number of reflection regions 81 and the number of illuminating devices 14 coincide with each other. In addition, for example, positional relation between the reflection regions 81 coincides with arrangement relation between the illuminating devices 14.

Hence, when at least one of the shape, number, and arrangement of high-luminance regions detected from the captured image does not correspond to that of the biosensor of the authentication device 10, there is a strong possibility that the detected high-luminance regions are not specular reflections of illumination of the illuminating devices 14. In a case where there is another light source such as external light other than the illuminating devices 14 of the biosensor, high-luminance parts may occur within the target region even when the subject is a living body, and there is a very strong possibility that the high-luminance parts in this case do not coincide with the shape, number, and arrangement of the biosensor.

Incidentally, in a case where biometric authentication is a system of performing authentication using a plurality of captured images captured consecutively, the processing of determining whether or not the subject is a living body may be performed on at least one of the plurality of captured images.

Figure 9:
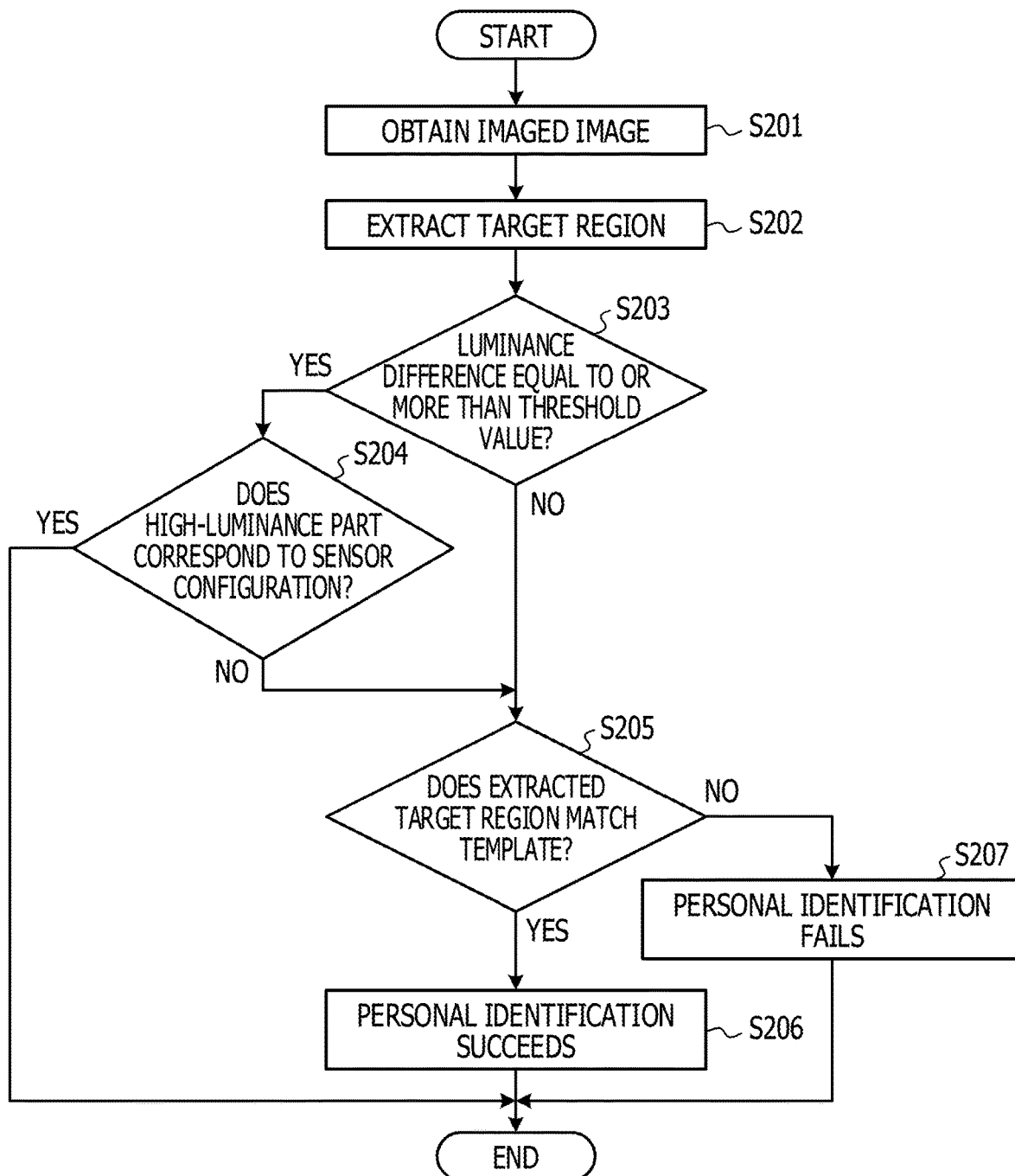
FIG. 9 is a flowchart illustrating an example of an authentication processing procedure of an authentication device.

Description will next be made of an example of an authentication processing procedure of the authentication device 10 according to the modification. FIG. 9 is a flowchart illustrating an example of the authentication processing procedure of the authentication device 10.

The control section 21 of the authentication device 10, for example, obtains a captured image by making the imaging section 23 image a subject in a state in which the illuminating section 24 is made to apply light (S201). The control section 21 extracts a target region from the obtained captured image (S202). The control section 21 determines whether or not there is a luminance difference equal to or more than the threshold value in the extracted target region (S203).

When there is a luminance difference equal to or more than the threshold value (Yes in S203), the control section 21 determines whether or not a high-luminance part having the luminance difference equal to or more than the threshold value in the target region corresponds to the configuration of the biosensor (S204). Incidentally, the correspondence between the high-luminance part and the configuration of the biosensor may be determined using at least one of the shape, the number, and the arrangement, may be determined using combinations of any two of those, or may be determined using all of those. For example, the control section 21 determines whether or not the high-luminance part corresponds to all of one(s) being used of the shape, number, and arrangement of the biosensor.

When the high-luminance part corresponds to the configuration of the biosensor (Yes in S204), it is determined that the target region is a non-living body image, and the authentication processing is ended. In this case, the control section 21 may, for example, output information indicating that the authentication processing is discontinued.

When the high-luminance part does not correspond to the configuration of the biosensor (No in S204), or when there is no luminance difference equal to or more than the threshold value (No in S203), the control section 21 performs the verification processing of the extracted target region and a template registered in advance, and determines whether the extracted target region coincides with the template (S205).

When the extracted target region coincides with the template (Yes in S205), the control section 21 determines that personal identification (the verification processing) has succeeded (S206), and ends the authentication processing. In this case, the control section 21 may, for example, output information indicating that that the authentication processing has succeeded.

When the extracted target region does not coincide with the template (No in S205), the control section 21 determines that personal identification (the verification processing) has failed (S207), and ends the authentication processing. In this case, the control section 21 may, for example, output information indicating that that the authentication processing has failed.

As described above, according to the modification, when a high-luminance part is detected from the captured image, the high-luminance part having a higher luminance equal to or more than the threshold value as compared with other parts of the target region, the authentication device 10 determines whether the detected high-luminance part corresponds to the configuration of the biosensor. It is thereby possible to determine whether the detected high-luminance part originates from specular reflection of illumination of the illuminating devices 14 included in the biosensor. Hence, there results a reduced possibility that the subject is erroneously determined to be a non-living body when a high-luminance part originating from another light source is observed from the target region even though the subject is a living body, for example.

The present technology is not limited to the configurations and procedures of the embodiment and the modification described above, but alteration, recombination, and the like of processing methods may be performed as appropriate without departing from the spirit of the present technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An authentication device comprising:
   an illumination device;
   a camera; and
   a processor coupled to the camera and the processor configured to
   obtain, by capturing by the camera, an image including a subject illuminated by light from the illumination device,
   extract a target region of the subject from the obtained image, and
   in response that a difference between a first luminance value and a second luminance value is greater than a threshold, determine that the subject included in the image is not a living body to dismiss a result of processing related to authentication for the subject, the first luminance value being a luminance value based on a first part in the extracted target region, the second luminance value being a luminance value based on a second part in the extracted target region, the first part being a part other than the second part in the extracted target region.

2. The authentication device according to claim 1, wherein the processing related to the authentication is verification processing based on the image.

3. The authentication device according to claim 2, wherein
the verification processing includes identifying, from a plurality of registered templates, a template corresponding to the image.

4. The authentication device according to claim 1, wherein
the processing related to the authentication is registration processing of verification information based on the image.

5. The authentication device according to claim 1, wherein
the determination includes forbidding verification of whether a feature quantity of the target region matches verification information stored in a storage device.

6. The authentication device according to claim 1, wherein
the processor is configured to, when the first part is not included in the target region, perform verification of whether a feature quantity of the target region matches verification information stored in a storage device.

7. The authentication device according to claim 1, wherein
the processor is configured to determine whether the first part corresponds to a configuration of the illumination device, and
the determination is executed when the first part corresponds to the configuration of the illumination device.

8. The authentication device according to claim 7, wherein
whether the first part corresponds to the configuration of the illumination device is determined by pattern matching between the first part and a template related to at least one of a number, a shape, and an arrangement of the illumination device.

9. A computer-implemented authentication method comprising:
obtaining, by capturing by a camera, an image including a subject illuminated by light from an illumination device;
extracting a target region of the subject from the obtained image; and
in response that a difference between a first luminance value and a second luminance value is greater than a threshold, determining that the subject included in the image is not a living body to dismiss a result of processing related to authentication for the subject, the first luminance value being a luminance value based on a first part in the extracted target region, the second luminance value being a luminance value based on a second part in the extracted target region, the first part being a part other than the second part in the extracted target region.

10. The authentication method according to claim 9, wherein
the processing related to the authentication is verification processing based on the image.

11. The authentication method according to claim 10, wherein
the verification processing includes identifying, from a plurality of registered templates, a template corresponding to the image.

12. The authentication method according to claim 9, wherein
the processing related to the authentication is registration processing of verification information based on the image.

13. The authentication method according to claim 9, wherein
the determining includes forbidding verification of whether a feature quantity of the target region matches verification information stored in a storage device.

14. The authentication method according to claim 9, further comprising:
when the first part is not included in the target region, performing verification of whether a feature quantity of the target region matches verification information stored in a storage device.

15. The authentication method according to claim 9, further comprising: determining whether the first part corresponds to a configuration of the illumination device, wherein the determination is executed when the first part corresponds to the configuration of the illumination device.

16. The authentication method according to claim 15, wherein
whether the first part corresponds to the configuration of the illumination device is determined by pattern matching between the first part and a template related to at least one of a number, a shape, and an arrangement of the illumination device.

17. A non-transitory computer-readable medium storing authentication program instructions executable by one or more computers, the authentication program instructions comprising:
one or more instructions for obtaining, by capturing by a camera, an image including a subject illuminated by light from an illumination device;
one or more instructions for extracting a target region of the subject from the obtained image; and
one or more instructions for performing, in response that a difference between a first luminance value and a second luminance value is greater than a threshold, a determination that the subject included in the image is not a living body to dismiss a result of processing related to authentication for the subject, the first luminance value being a luminance value based on a first part in the extracted target region, the second luminance value being a luminance value based on a second part in the extracted target region, the first part being a part other than the second part in the extracted target region.

* * * * *